United States Patent
Ikeda et al.

(10) Patent No.: US 6,507,004 B2
(45) Date of Patent: Jan. 14, 2003

(54) DC POWER SUPPLY APPARATUS FOR ARC-UTILIZING APPARATUSES

(75) Inventors: Tetsuro Ikeda, Osaka (JP); Toru Arai, Kyoto (JP); Hideo Ishii, Minoo (JP)

(73) Assignee: Sansha Electric Manufacturing Company, Limited, Osaka (JP)

( * ) Notice: Subject to any disclaimer, the term of this patent is extended or adjusted under 35 U.S.C. 154(b) by 0 days.

(21) Appl. No.: 09/988,434

(22) Filed: Nov. 20, 2001

(65) Prior Publication Data

US 2002/0063116 A1 May 30, 2002

(30) Foreign Application Priority Data

Nov. 24, 2000 (JP) ........................................ 2000-357492

(51) Int. Cl.[7] .................................................. B23K 9/10
(52) U.S. Cl. .................................. 219/130.21; 363/142
(58) Field of Search ........................ 219/130.21, 130.1, 219/130.31, 130.32, 130.33, 137 PS; 363/142, 143

(56) References Cited

U.S. PATENT DOCUMENTS

| | | | | |
|---|---|---|---|---|
| 5,310,992 A | * | 5/1994 | Karino et al. | 219/130.21 |
| 5,930,122 A | * | 7/1999 | Moriguchi et al. | 363/17 |
| 6,054,674 A | * | 4/2000 | Moriguchi et al. | 219/130.21 |
| 6,069,811 A | * | 5/2000 | Moriguchi et al. | 363/142 |
| 6,269,015 B1 | * | 7/2001 | Ikeda et al. | 219/130.21 |

* cited by examiner

Primary Examiner—Clifford C. Shaw
(74) Attorney, Agent, or Firm—Duane Morris LLP

(57) ABSTRACT

A DC power supply apparatus has two power supply input terminals between which one of 100 V level, 200 V level and 400 V level AC power supply voltages or a 575 V AC power supply voltage is applied. A rectifying unit is connected between the two power supply input terminals, and a voltage-lowering converter is connected to the rectifying unit. A thyristor is connected between the input and output of the voltage-lowering converter. A series combination of two capacitors is connected between two output terminals of the voltage-lowering converter. A switch circuit is connected between the junction of the two capacitors and one input terminal of the rectifying unit. An inverter converts a DC voltage appearing across the series combination of the capacitors into a high-frequency voltage, which, in turn, is voltage transformed by a transformer. The voltage-transformed high-frequency voltage is converted into a DC voltage in a high-frequency-to-DC converter for application to a load. When a 100 V level voltage is applied between the power supply input terminals, the thyristor is turned on, the voltage-lowering converter is turned off and the switch circuit is turned on. When one of the 200 V level voltages is connected, the thyristor is turned on, the voltage-lowering converter is turned off, and the switch circuit is turned off. When one of the 400 V level voltages or the 575 V voltage is applied between the power supply input terminals, the thyristor is turned off, the voltage-lowering converter is turned on, and the switch circuit is turned off.

6 Claims, 2 Drawing Sheets

DC POWER SUPPLY APPARATUS FOR ARC-UTILIZING APPARATUSES

This invention relates to a DC power supply apparatus useable with arc-utilizing apparatuses, such as an arc welder, an arc cutter or a discharge lamp ignition apparatus, and, more particularly, to such DC power supply apparatus operable from any one of a plurality of AC voltages.

BACKGROUND OF THE INVENTION

A DC power supply apparatus for use with an arc-utilizing apparatus is frequently operated from a commercial AC power supply. There are commercial AC power supplies supplying voltages of different magnitudes. For example, there are power supplies supplying higher voltages of, for example, 380 V, 400 V, 410 V, 460 V and 575 V, which form a higher voltage group, and there are power supplies supplying lower voltages of, for example, 200 V, 208 V, 230 V and 240 V, which form a lower voltage group. DC power supply apparatuses are designed to convert a local commercial AC voltage into a DC voltage. On the other hand, there are areas including regions where a high commercial AC voltage is supplied and regions where a low commercial AC voltage is supplied. Accordingly, a user must be very careful to determine which one of DC power supply apparatuses should be used, a high-voltage type or a low-voltage type. Therefore, a DC power supply apparatus operable either from a higher-voltage supplying commercial AC power supply or a lower-voltage supplying commercial AC power supply has been long desired.

An example of such DC power supply apparatuses is disclosed in U.S. Pat. No. 6,054,674 issued on Apr. 25, 2000 to Haruo Moriguchi et al., entitled "DC Power Supply Apparatus for Arc-Utilizing Apparatuses", which corresponds to Japanese Patent Application Publication No. HEI 11-206123 A published on Jul. 30, 1999. The circuit diagram of the power supply apparatus disclosed in this U.S. patent is shown in FIG. 1. The DC power supply apparatus has power supply input terminals 1a, 1b and 1c.

Let it be assumed that one of the voltages in the lower commercial AC voltage group is applied to the power supply input terminals 1a–1c. The AC voltage is coupled to an input-side rectifier 3 through switches 2a, 2b and 2c, where it is rectified. A switch control unit 30 judges that the low AC voltage is being applied to the input terminals 1a–1c. The judgment made by the switch control unit 30 is provided to a voltage-lowering converter control unit 9, in response to which the control unit 9 sends a command to a thyristor control unit 11 for turning on a thyristor 10. At the same time, the switch control unit 30 opens a normally-closed switch 12a and closes normally-open switches 12b and 12c, which causes smoothing capacitors 8a and 8b to be connected in parallel with each other. Then, the voltage resulting from the rectification of the low commercial AC voltage is smoothed by the capacitors 8a and 8b connected in parallel, and the smoothed voltages are applied to inverters 14a and 14b connected in parallel with the capacitors 8a and 8b, respectively, where they are converted into high-frequency voltages. The high-frequency voltages from the inverters 14a and 14b are transformed by of voltage transformers 18a and 18b, respectively, and the transformed voltages are rectified by output-side rectifiers 20a and 20b and smoothed by smoothing reactors 26a and 26b. The rectified and smoothed voltage appearing between output terminals 28P and 28N is applied to a load (not shown).

When one of the voltages in the higher commercial AC voltage group, other than the highest voltage of 575 V, is applied to the power supply input terminals 1a–1c, it is rectified in the input-side rectifier 3. The switch control unit 30 makes a judgment that the high commercial AC voltage other than 575 V is applied, which causes the thyristor 10 to be turned on. This causes the normally-closed switch 12a to be closed and causes the normally-open switches 12b and 12b to be opened. This, in turn, causes the capacitors 8a and 8b to be connected in series with each other. The high voltage resulting from rectifying the high commercial AC voltage is applied across the series combination of the capacitors 8a and 8b. In the same manner as described above with respect to the low commercial AC voltage applied to the power supply input terminals 1a–1c, a corresponding DC voltage is developed between the output terminals 28P and 28N for application to a load.

When the commercial AC power supply providing a voltage of 575 V, which is the highest one of the higher AC voltage group in the example being discussed, is applied to the power supply input terminals 1a–1c, it is rectified in the input-side rectifier 3. The switch control unit 30 detects the 575 V commercial AC power supply being used, and the thyristor 10 is turned off. The normally-closed switch 12a is closed, and the normally-opened switches 12b and 12c are opened, which results in connecting the capacitors 8a and 8b in series with each other. An IGBT 5 of a voltage-lowering converter 4, which is formed of, in addition to the IGBT 5, a flywheel diode 6 and a smoothing reactor 7, is so controlled by the voltage-lowering converter control unit 9 as to couple a lowered, rectified voltage across the series combination of the capacitors 8a and 8b. The magnitude of the rectified voltage across the capacitor series combination is the same as the one applied when the second highest one of the higher AC voltage group, i.e. 460 V in the example being discussed, is applied to the power supply input terminals 1a–1c. In the same manner as described above with respect to a lower voltage applied to the power supply input terminals 1a–1c, a DC voltage is developed between the output terminals 28P and 28N for application to the load.

When one of the voltages in the lower voltage group, namely, 200 V, 208 V, 230 V or 240 V, is applied to the power supply input terminals 1a–1c, the magnitude of the voltage applied across the parallel combination of the capacitors 8a and 8b is equal to the input AC power supply voltage multiplied by $\sqrt{2}$. For example, the voltage applied across the parallel combination of the smoothing capacitors 8a and 8b is about 280 V when the commercial AC power supply providing a voltage of 200 V is connected to the input terminals 1a–1c. When the input commercial AC power supply voltage is 240 V, the magnitude of the voltage applied across the capacitor parallel combination is about 340 V.

When one of the voltages in the higher voltage group except for the voltage of 575 V, namely, 380 V, 400 V, 410 V or 460 V, is applied to the power supply input terminals 1a–1c, the magnitude of the voltage applied across each of the serially connected capacitors 8a and 8b is equal to the input AC power supply voltage multiplied by $\sqrt{2}/2$. For example, the voltage applied across each of the smoothing capacitors 8a and 8b connected in series is about 270 V when the commercial AC power supply providing a voltage of 380 V is connected to the input terminals 1a–1c. When the input commercial AC power supply voltage is 460 V, the magnitude of the voltage applied across each capacitor is about 325 V.

The voltage-lowering converter 4 is so arranged as to develop an output voltage of 460 V multiplied by $\sqrt{2}$, which is about 650 V, when the commercial AC voltage of 575 V is applied to the power supply input terminals 1a–1c.

Therefore, a voltage of about 325 V is applied across each of the capacitors 8a and 8b connected in series with each other.

With the described arrangement, readily available general-purpose semiconductor devices which can deal with a maximum voltage of 340 V can be used as the semiconductor switching devices of the inverters 14a and 14b, for dealing with lower and higher voltages of various magnitudes.

In some countries or areas, such as U.S.A. and Japan, lower commercial AC voltages of 100 V and 115 V are adopted. When a DC power supply apparatus of the above-described type is used in such countries or areas, the smoothing capacitors 8a and 8b are connected in parallel with each other, and, therefore, the voltage across each of the smoothing capacitors 8a and 8b is 100 V or 115 V multiplied by $\sqrt{2}$, i.e. about 140 V or about 160 V. Accordingly, a voltage of the magnitude required by a load cannot be developed between the output terminals 28P and 28N.

In other words, the DC power supply apparatus described thus far cannot deal with all of the lower commercial AC voltages on the order of 100 V, the lower commercial AC voltages on the order of 200 V, the higher commercial AC voltages of about two times the 200 V order voltages and higher.

Therefore, an object of the present invention is to provides a DC power supply apparatus for arc-utilizing apparatuses which can be used with various commercial AC power supplies supplying commercial AC voltages including the lower voltages on the order of 100 V.

SUMMARY OF THE INVENTION

A DC power supply apparatus for arc-utilizing apparatuses according to the present invention has power supply input terminals adapted to receive one of a first AC voltage, a second AC voltage having a magnitude about two times the first AC voltage, and a third AC voltage having a magnitude two or more times as large as the second AC voltage. The first AC voltage may be one of a plurality of commercial AC voltages provided by a first group of commercial AC power supplies. The second AC voltage may be one of a plurality of commercial AC voltages provided by a second group of commercial AC power supplies, and the third AC voltage may be one of a plurality of commercial AC voltages provided by a third group of commercial AC power supplies.

Two inputs of a rectifying unit are connected to the power supply input terminals for receiving and full-wave rectifying the AC voltage applied to the power supply input terminals. The resultant output voltage of the rectifying unit is applied to a voltage-lowering converter, which develops a predetermined lowered voltage between output terminals thereof. A bypass switch provides a bypass between the input and output of the voltage-lowering converter.

First and second capacitors are connected in series between the output terminals of the voltage-lowering converter. A switch circuit is connected between the junction of the first and second capacitors and one of the input terminals of the rectifying unit. A DC-to-high-voltage converter converts a DC voltage across the series combination of the first and second capacitors into a high-frequency voltage, which, in turn, is voltage-transformed by a transformer. A high-frequency-to-DC converter converts the high-frequency voltage from the transformer into a DC voltage.

When the first AC voltage is applied to the power supply input terminals, a controller operates to turn on or close the bypass switch, to turn off the voltage-lowering converter, and to turn on the switch circuit. Then, part of diodes of the rectifying unit, the switch circuit and the first and second capacitors form a full-wave type, voltage doubler rectifier circuit.

If the voltage applied to the power supply input terminal is the second AC voltage, the controller operates to turn on the bypass switch, to turn off the voltage-lowering converter, and to turn off the switch circuit. When the third AC voltage is applied to the power supply input terminals, the controller turns off the bypass switch, turns on the voltage-lowering converter and turns off the switch circuit.

When the first AC voltage is applied to the power supply input terminals of the DC power supply apparatus of the present invention, the switch circuit and the bypass switch are turned on, and, therefore, the rectifying unit operates as a full-wave voltage-doubler rectifier circuit. Accordingly, a voltage equal to the first AC voltage multiplied by $2\times\sqrt{2}$ is applied across the series combination of the first and second capacitors.

When the second AC voltage is applied, the switch circuit is turned off and the bypass switch is turned on. Therefore the rectifying unit full-wave rectifies the second AC voltage, and a voltage equal to the second AC voltage multiplied by $\sqrt{2}$ is applied across the series combination of the first and second capacitors. Since the magnitude of the second AC voltage is about two times that of the first AC voltage, the respective voltages applied across the series combination of the first and second capacitors when the first AC voltage and the second AC voltage are applied to the power supply input terminals differ little.

With the third AC voltage applied to the power supply input terminals, both the bypass switch and the switch circuit are turned off, and the voltage-lowering converter is turned on. Therefore, a voltage resulting from full-wave rectifying the third AC voltage is applied to the voltage-lowering converter, which, then, develops a voltage lower than the voltage applied to the power supply input terminals. The lower voltage is applied across the series combination of the first and second capacitors.

As described, the DC voltage applied to the DC-to-high-frequency converter is approximately the same, and, therefore, the DC voltage the load requires can be supplied to the load whichever one of the first, second and third AC voltages is applied to the power supply input terminals.

The controller may include a voltage detector. The voltage detector detects the first, second or third AC voltages applied to the power supply input terminals and develops a voltage representative signal, namely, a first AC-voltage representative signal, a second AC-voltage representative signal or a third AC-voltage representative signal. In this case, a selection signal generator and a coincidence judgement device are also used. The selection signal generator has a selector or operating device with which a user can select a selection signal corresponding to one of the first through third AC voltages. The selection signal is applied to the coincidence judgement device, to which the voltage representative signal is coupled, too. The coincidence judgement device causes the bypass switch and the voltage-lowering converter to be turned off when the voltage representative signal and the selection signal are not coincident.

With the above-described arrangement, the DC power supply apparatus does not operate when the intended voltage is different from the voltage actually coupled to the power supply input terminals.

The controller may be so arranged as to cause the coincident judgement device to turn off the bypass switch and the voltage-lowering converter when the voltage representative signal does not coincide with the selection signal, and also to cause the bypass switch and the switch circuit to be turned on and the voltage-lowering converter to be turned off when both of the voltage representative signal from the voltage detector and the selection signal from the selection signal generator are representative of the first AC voltage.

With this arrangement, the DC power supply apparatus does not operate if the AC voltage coupled to the power supply input terminals of the apparatus is not the voltage from which the user intends to operate the apparatus. Thus, an erroneous operation can be avoided. Also, if the user intends to operate the power supply apparatus from the first AC voltage, and the AC voltage coupled to the input terminals is actually the first AC voltage, the apparatus can operate normally.

The controller may be so arranged that it causes the coincidence judgement device to turn off the bypass switch and the voltage-lowering converter when the AC voltage represented by the voltage representative signal from the voltage detector is not coincident with the AC voltage represented by the selection signal from the selection signal generator, and causes the coincidence judgement device to turn on the bypass switch and turn off the switch circuit and the voltage-lowering converter when the voltage representative signal corresponds to the selection signal.

With this arrangement, when the user intends to operate the DC power supply apparatus from one of the first through third AC voltages and if the voltage which actually is coupled to the input terminals is different voltage, the DC power supply apparatus is prevented from operating. If the voltage intended to operate the apparatus from is the second AC voltage when the second AC voltage is coupled to the power supply input terminals, the DC power supply apparatus can operate normally.

The controller may be so arranged that it causes the coincidence judgement device to turn off the bypass switch and the voltage-lowering converter when the voltage represented by the voltage representative signal from the voltage detector and the selection signal from the selection signal generator are different, and causes the coincidence judgement device to turn off the bypass switch and the switch circuit and turn on the voltage-lowering converter when both the voltage representative signal and the selection signal correspond to the third AC voltage.

Thus, if the voltage actually applied to the power supply input terminals of the DC power supply apparatus is not the voltage the user intends to operate the DC power supply apparatus from, the apparatus is prevented from operating, and if the third AC voltage is being applied to the power supply input terminals when the user intends to operate the power supply apparatus from the third AC power supply voltage, the DC power supply apparatus can operate normally.

The controller may include a coincidence judgement device as well as the above-described voltage detector and the selection signal generator. The coincidence judgement device receives the voltage representative signal from the voltage detector and the selection signal from the selection signal generator. The coincidence judgement device causes the bypass switch and the switch circuit to be turned on and cause the voltage-lowering converter to be turned off when both of the voltage representative signal and the section signal correspond to the first AC voltage. The coincidence judgement device causes the bypass switch to be turned on and causes the switch circuit and the voltage-lowering converter to be turned off when the voltages represented by the voltage representative signal and the selection signal are the second AC voltage. If both of the voltage representative signal from the voltage detector and the selection signal from the selection signal generator represent the third AC voltage, the coincidence judgement device causes the bypass switch and the switch circuit to be turned off, and causes the voltage-lowering converter to be turned on. If the voltage represented by the voltage representative signal is different from the voltage represented by the selection signal, the coincidence judgement device controls the selection signal generator to make the selection signal correspond to the voltage representative signal from the voltage detector.

With this arrangement, if the voltage intended to be used differs from the voltage being applied to the power supply input terminals, the selection signal is changed to correspond to the voltage at the power supply input terminals so that the DC power supply apparatus can operate normally. Accordingly, even when the user cannot identify the voltage actually coupled to the power supply input terminals of the apparatus, the DC power supply apparatus can operate normally.

DETAILED DESCRIPTION OF AN EMBODIMENT

Figure 1:
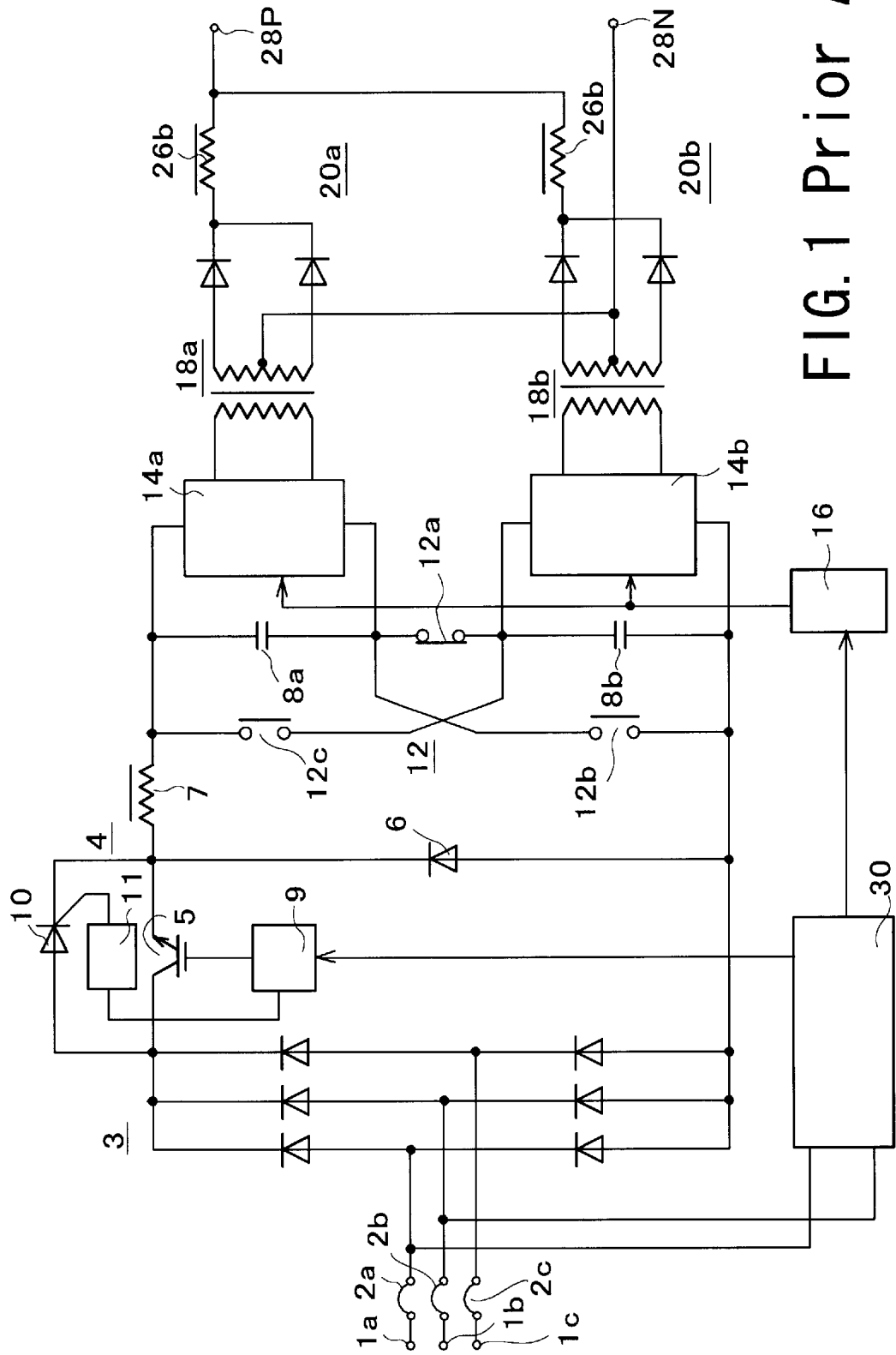
FIG. 1 is a block circuit diagram of a prior art DC power supply apparatus.
Figure 2:
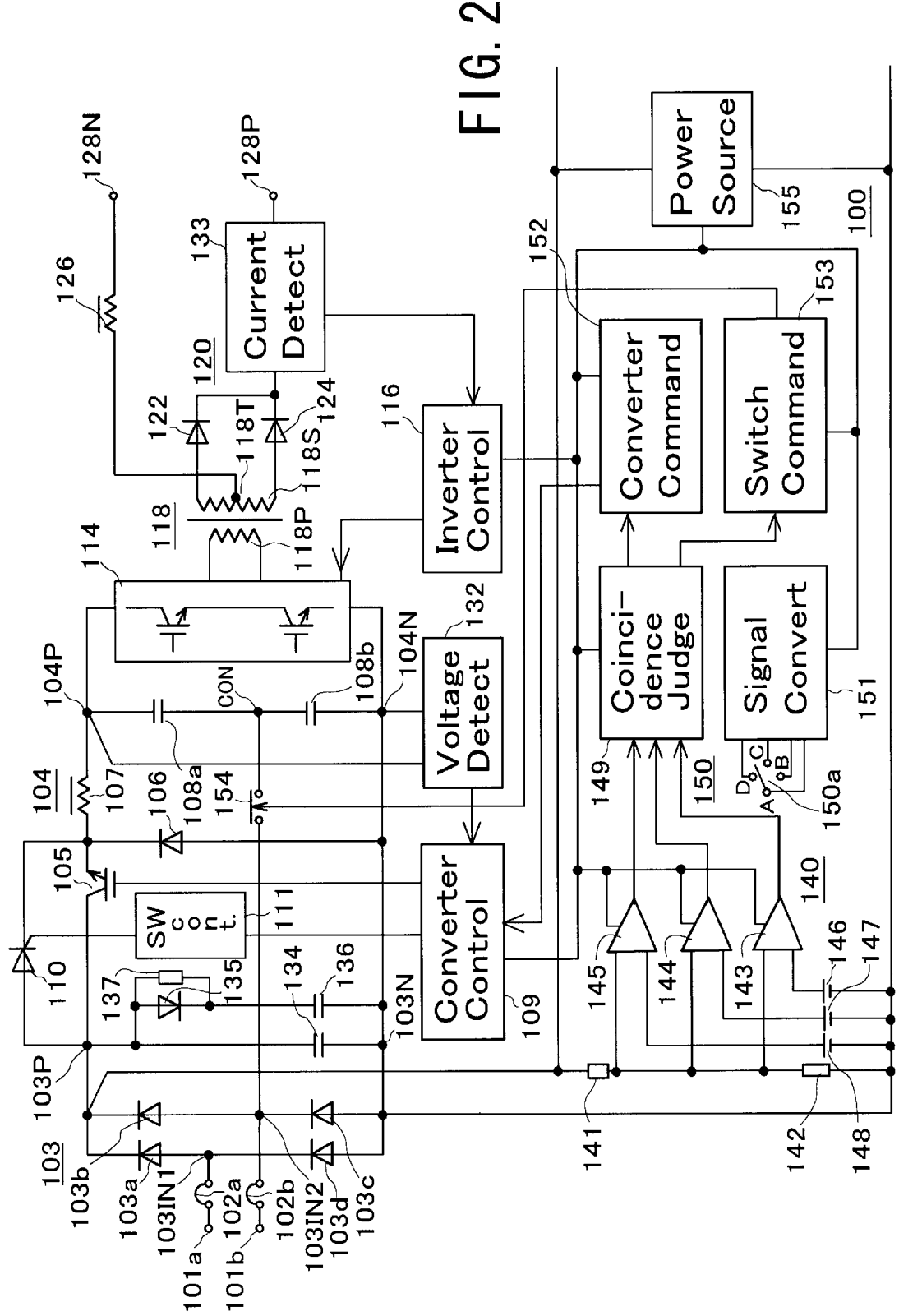
FIG. 2 is a partially block circuit diagram of a DC power supply apparatus according to en embodiment of the present invention.

A DC power supply apparatus for arc-utilizing apparatuses according to one embodiment is shown in FIG. 2. The DC power supply apparatus may be used with, for example, an arc welder, and has power supply input terminals 101a and 101b, which are adapted to be coupled to a single-phase commercial AC power supply. The power supply connected to the power supply input terminals 101a and 101b may be one of 100 V level lower voltage supplying power supplies (hereinafter referred to as 100 V level power supplies) supplying a voltage having a root-mean-square value of 100 V or 115 V (hereinafter referred to as 100 V level voltage), one of 200 V level lower voltage supplying power supplies (hereinafter referred to as 200 V level power supplies) supplying a voltage having a root-mean-square value of 200 V, 208 V, 230 V or 240 V (hereinafter referred to as 200 V level voltage), one of 400 V level higher voltage supplying power supplies (hereinafter referred to as 400 V level power supplies) supplying a higher voltage having a root-mean-square value of 380 V, 400 V, 410 V, 440 V or 460 V (hereinafter referred to as 400 V level voltage), or a 575 V voltage supplying power supply (hereinafter referred to as 575 V power supply) supplying a higher voltage having a root-mean-square value of 575 V (hereinafter referred to as 575 V voltage).

The magnitudes of the 200 V level voltages are about two times or about 2.4 times at the maximum as large as the magnitudes of the 100 V level voltages. The magnitudes of the 400 V level voltages and the 575 V voltage are about two times or more as large as the magnitudes of the 200 V level voltages.

The power supply input terminals 101a and 101b are coupled through switches 102a and 102b, respectively, to respective ones of two rectifier input terminals 103IN1 and 103IN2 of a rectifying unit 103. The rectifying unit 103 may be, for example a full-wave rectifying circuit including rectifier diodes 103a, 103b, 103c and 103d which are connected in a bridge configuration. A rectified voltage resulting from the rectification is developed between two rectifier output terminals 103P and 103N.

A smoothing capacitor 134 is connected between the rectifier output terminals 103P and 103N for smoothing the rectified voltage. A surge absorbing circuit is connected in parallel with the smoothing capacitor 134, and includes a series combination of a diode 135 and a capacitor 136, and a resistor 137 connected in parallel with the diode 135. The surge absorbing circuit operates to couple a surge voltage, if and when it occurs in the output side of the rectifying unit 103, through the diode 135 to the capacitor 136 so that the capacitor 136 can absorbs the surge voltage.

The input of a voltage-lowering converter 104 is connected between the rectifier output terminals 103P and 103N. Specifically, a semiconductor switching device, for example, an IGBT 105 is connected at its collector to the rectifier output terminal 103P. The emitter of the IGBT 105 is connected to the cathode of a flywheel diode 106 having its anode connected to the rectifier output terminal 103N. The emitter of the IGBT 105 is also connected to one end of a smoothing reactor 107. The other end of the reactor 107 and the rectifier output terminal 103N provide output terminals 104P and 104N of the voltage-lowering converter 104. A series combination of capacitors 108a and 108b is connected between the converter output terminals 104P and 104N.

The voltage appearing across the series combination of the capacitors 108a and 108b is detected by a voltage detector 132. The conduction period of the IGBT 105 is feedback controlled by the voltage detector 132 and a voltage-lowering converter control unit (hereinafter referred to as converter control unit) 109 so as to make the detected voltage have a predetermined value.

A bypass switch, e.g. a thyristor, 110 is connected between the rectifier output terminal 103P and the emitter of the IGBT 105. The thyristor 110 has its anode connected to the rectifier output terminal 103P and has its cathode connected to the emitter of the IGBT 105. The thyristor 110 is rendered conductive when a gating signal is applied to its gate from a bypass switch control unit 111 whereby the current from the rectifier output 103P is bypassed through the thyristor 110 and the reactor 107 to the converter output terminal 104P of the voltage-lowering converter 104.

A switch circuit 154 is connected between the junction CON of the capacitors 108a and 108b and the input terminal 103IN2 of the rectifying unit 103. When the switch circuit 154 is open, the rectifying unit 103 functions as a full-wave rectifier circuit. When the switch circuit 154 is closed and the thyristor 110 is conductive, the diodes 103a and 103d of the rectifying unit 103, the thyristor 110, the smoothing reactor 107, the capacitors 108a and 108b and the switch circuit 154 form a full-wave voltage doubler rectifier circuit.

A DC-to-high-frequency converter, e.g. an inverter, 114 is connected between the voltage-lowering converter output terminals 104P and 104N. The inverter 114 may be a full-bridge or half-bridge type inverter formed of a plurality of semiconductor switching devices, e.g. IGBTs.

The output of the inverter 114 is connected to a primary winding 118P of a transformer 118. A voltage-transformed high-frequency voltage is induced in a secondary winding 118S of the transformer 118. The induced high-frequency voltage is converted into a DC voltage in a high-frequency-to-DC converter 120, which includes rectifying diodes 122 and 124 with their anodes connected to the respective ends of the secondary winding 118S. The cathodes of the diodes 122 and 124 are connected together to an output terminal 128P of the DC power supply apparatus. An intermediate tap 118T on the secondary winding 118S is connected through a smoothing reactor 126 to another output terminal 128N of the DC power supply apparatus. The output terminals 128P and 128N are adapted to be connected to a load, e.g. a welder load including a workpiece and an electrode.

A current detector 133 is connected between the output terminal 128P and the junction of the cathodes of the diodes 122 and 124 for detecting the load current flowing through the load. The current detector 133 and an inverter control unit 116 feedback control the conduction periods of the IGBTs of the inverter 114 so as to make the load current have a predetermined value. In other words, the power supply apparatus is constant current controlled.

A controller 100 controls the operation of the DC power supply apparatus in accordance with the voltage applied to the power supply input terminals 101a and 101b. The controller 100 includes a voltage detecting unit 140, which has a voltage divider connected between the rectifier output terminals 103P and 103N. The voltage divider is formed of resistors 141 and 142 connected in series between the rectifier output terminals 103P and 103N. A voltage across the resistor 142 is applied to comparing means, e.g. comparators 143, 144 and 145 of the voltage detecting unit 140. The comparator 143 receives a first reference voltage from a first reference voltage source 146, the comparator 144 does a second reference voltage from a second reference voltage source 147, and the comparator 145 does a third reference voltage from a third reference voltage source 148.

The first reference voltage may be a voltage corresponding to a voltage resulting from rectifying the lowest one of the 100 V level voltages, namely, 100 V, applied to the power supply input terminals 101a and 101b, by the rectifier 103, smoothing the rectified voltage by the capacitor 134 and voltage dividing the rectified and smoothed voltage by the resistors 141 and 142. The comparator 143 develops an output signal when the voltage across the resistor 142 is equal to or greater than the first reference voltage.

The second reference voltage may be a voltage corresponding to a voltage resulting from rectifying the lowest one of the 200 V level voltages, namely, 200 V, applied to the power supply input terminals 101a and 101b, by the rectifier 103, smoothing the rectified voltage by the capacitor 134 and voltage dividing the rectified and smoothed voltage by the resistors 141 and 142. The comparator 144 develops an output signal when the voltage across the resistor 142 is equal to or greater than the second reference voltage.

The third reference voltage may be a voltage corresponding to a voltage resulting from rectifying the lowest one of the 400 V level voltages and the 575 V voltage, namely, 380 V, applied to the power supply input terminals 101a and 101b, by the rectifier 103, smoothing the rectified voltage by the capacitor 134 and voltage dividing the rectified and smoothed voltage by the resistors 141 and 142. The comparator 145 develops an output signal when the voltage across the resistor 142 is equal to or greater than the third reference voltage.

With the above-described arrangement, when one of the 100 V level commercial AC power supplies is connected between the power supply input terminals 101a and 101b, only the comparator 143 develops an output signal, which is applied as a first AC-voltage representative signal to a coincidence circuit 149.

When one of the 200 V level commercial AC power supplies is applied between the power supply input terminals 101a and 101b, the comparators 143 and 144 develop output signals, which are applied as a second AC-voltage representative signal to the coincidence circuit 149.

When one of the 400 V level voltage supplying commercial AC power supplies or the 575 V voltage supplying commercial AC power supply is connected between the power supply input terminals 101a and 101b, output signals of the comparators 143, 144 and 145 are applied as a third AC-voltage representative signal to the coincidence circuit 149.

The coincidence circuit 149 receives a selection signal, too, from a selection signal generator 150. The selection signal generator 150 is formed of a selector 150a and an electrical signal converter 151. The selector 150a has a contact arm A and contacts B, C and D. An operator can manipulate the arm A in order to bring it into contact with any one of the contacts B, C and D. When the arm A is thrown to and in contact with the contact B, the electrical signal converter 151 provides the coincidence circuit 149 with a first selection signal indicating that the DC power supply apparatus should be operated from one of the 100 V level lower commercial AC power supplies.

When the arm A is in contact with the contact C, the electrical signal converter 151 provides the coincidence circuit 149 with a second selection signal indicating that the power supply apparatus should be operated from one of the 200 V level lower commercial AC power supplies.

When the arm A is in contact with the contact D, the electrical signal converter 151 provides the coincidence circuit 149 with a third selection signal, which indicates that the power supply apparatus should be operated from one of first, 400 V level voltage supplying commercial AC power supplies or the 575 V voltage supplying commercial AC power supply.

When only the comparator 143 supplies an output signal to the coincidence circuit 149 while the coincidence circuit 149 is receiving the first selection signal from the selection signal generator 150, the coincidence circuit 149 generates a 100-V-level energizing signal. When both of the comparators 143 and 144 supply an output signal to the coincidence circuit 149 while the coincidence circuit 149 is receiving the second selection signal from the selection signal generator 150, the coincidence circuit 149 generates a 200-V-level energizing signal. When all of the comparators 143, 144 and 145 supply an output signal to the coincidence circuit 149 while the coincidence circuit 149 is receiving the third selection signal from the selection signal generator 150, the coincidence circuit 149 generates a higher-voltage energizing signal.

Even when the first selection signal is applied to the coincidence circuit 149, it does not generate the corresponding energizing signal if it is not only the comparator 143 that supplies its output signal to the coincidence circuit 149. Also, even when the second selection signal is applied to the coincidence circuit 149, it does not generate the corresponding energizing signal if it does not occur that both and only both of the comparators 143 and 144 supply their output signals to the coincidence circuit 149. Further, even when the third selection signal is applied to the coincidence circuit 149, it does not generate the corresponding energizing signal if it does not occur that all of the comparators 143, 144 and 145 simultaneously supply their output signals to the coincidence circuit 149.

The energizing signal is applied to a voltage-lowering converter command unit 152 and to a switch circuit command unit 153. The voltage-lowering converter command unit 152 causes a voltage-lowering converter control unit 109 to operate when the 100-V-level or 200-V-level energizing signal is applied to the unit 152. Then, the voltage-lowering converter control unit 109 causes a bypass switch control unit 111 to operate to thereby render the thyristor 110 conductive.

When the higher-voltage energizing signal is applied to the voltage-lowering converter command unit 152, it causes the voltage-lowering converter control unit 109 to control the IGBT 105 of the voltage-lowering converter 104.

When no energizing signal is applied to the voltage-lowering converter command unit 152, it stops the voltage-lowering converter control unit 109 from operating, which renders the thyristor 110 nonconductive and stops the voltage-lowering converter 104 from operating.

When receiving the 100-V-level energizing signal, the switch circuit command unit 153 closes the switch circuit 154. The switch circuit 154 is open when either one of the other two energizing signals or no energizing signal is applied to the switch circuit command unit 153.

Power for operating the comparators 143, 144 and 145, the coincidence circuit 149, the electrical signal converter 151, the voltage-lowering converter command unit 152 and the switch circuit command unit 153 is supplied from a power source unit 155. The power source unit 155 prepares power for these components by appropriately adjusting the voltage appearing between the rectifier output terminals 103P and 103N.

With the above-described arrangement, when the contact arm A of the selector 150a is brought into contact with the contact B, indicating that the power supply apparatus should be operated from a 100 V level power supply, the coincidence circuit 149 generates no energizing signal and, therefore, the DC power supply apparatus does not operate unless only the comparator 143 provides an output signal.

With the selector 150a selecting the 100 V level lower commercial AC voltage and with one of the 100 V level lower commercial AC power supplies connected between the power supply input terminals 101a and 101b, the coincidence circuit 149 generates the 100-V-level energizing signal. This causes the thyristor 110 to be rendered conductive and the switch circuit 154 to be closed. This, in turn, causes the full-wave doubler rectifier circuit to operate, whereby a voltage of 100 V×2√2 (about 280 V) or 115 V×2 √2 (about 290 V) is developed between the output terminals 104P and 104N of the voltage-lowering converter 104. This voltage is converted into a high-frequency voltage in the inverter 114, then, transformed in the transformer 118, and converted into a DC voltage in the high-frequency-to-DC converter 120 for application to the load.

With the selector 150a indicating that a 200 V level voltage should be used and with no 200 V level power supply connected between the power supply input terminals 101a and 101b, the coincidence circuit 149 generates no energizing signal, and, therefore, the DC power supply apparatus does not operate.

With the selector 150a indicating that a 200 V level voltage should be used and with one of the 200 V level power supplies connected between the power supply input terminals 101a and 101b, the coincidence circuit 149 generates the 200-V-level energizing signal, which is applied to the voltage-lowering converter command unit 152, causing the voltage-lowering converter control unit 109 to activate the bypass switch control unit 111 so that the thyristor 110 is turned on. At the same time, the switch circuit command unit 153, receiving the 200-V-level energizing signal from the coincidence circuit 149, causes the switch circuit 154 to be opened. Therefore, the rectifying unit 103 operates as a full-wave rectifying circuit, which results in development, between the output terminals 104P and 104N of the voltage-lowering converter 104, of one of voltages of 200 V×√2 (about 280 V), 208 V×√2 (about 290 V), 230 V×√2 (about 320 V) and 240 V×√2 (about 340 V), depending on the 200 V level commercial AC voltage applied between the power supply input terminals 101a and 101b.

The voltage developed between the converter output terminals 104P and 104N is converted into a high-frequency voltage in the inverter 114, voltage-transformed in the transformer 118, converted into a DC voltage in the high-frequency-to-DC converter 120, and ultimately applied to the load.

If a commercial AC power supply supplying a voltage other than 400 V level voltages and 575 V voltage is connected between the power supply input terminals 101a and 101b when the selector 150a is in the position to indicate that the DC power supply apparatus should be operated from one of the 400 V level voltages or the 575 V voltage, the coincidence circuit 149 generates no energizing signal, and, therefore, the DC power supply apparatus does not operate.

If one of the 400 V level commercial AC voltages or the 575 V AC voltage is supplied between the power supply input terminals 101a and 101b when the selector 150a indicates that the power supply apparatus should be operated from such AC voltage, the coincidence circuit 149 generates the higher-voltage energizing signal, which is applied to the voltage-lowering converter command unit 152. The voltage-lowering converter command unit 152 commands the voltage-lowering converter control unit 109 to start controlling the IGBT 105. The higher-voltage energizing signal is also applied to the switch circuit command unit 153 to command the switch circuit 154 to open. This causes a voltage to be developed between the rectifier output terminals 103P and 103N, which voltage is one of voltages of 380 V×√2 (about 530 V), 400 V×√2 (about 560 V), 410 V×√2 (about 570 V), 440 V×√2 (about 610 V), 460 V×√2 (about 640 V) and 575 V×√2 (about 800 V), depending on the voltage applied between the power supply input terminals 101a and 101b. The voltage-lowering converter 104 lowers the voltage developed between the rectifier output terminals 103P and 103N is lowered to, for example, about 280 V. The 280 V voltage is, then, converted into a high-frequency voltage in the inverter 114, and the high-frequency voltage is voltage-transformed in the transformer 118. The voltage-transformed high-frequency voltage is, then, converted into a DC voltage in the high-frequency-to-DC converter 120, and finally applied to the load.

When a 100 V level power supply is connected to the power supply input terminals 101a and 101b, the switch circuit 154 is closed, so that the rectifying unit 103 and the smoothing capacitors 108a and 108b operate as a full-wave rectifier doubler circuit. Accordingly, the voltage supplied to the load can be substantially equal to the voltage supplied when a 200 V level power supply is used, and can be the voltage required by the load.

If the switch circuit 154 were closed to thereby make the rectifying unit 103 operate as a voltage doubler when one of the 200 V level and 400 V level power supplies or the 575 V power supply is connected to the power supply input terminals 101a and 101b, a very high voltage would be applied across the series combination of the capacitors 108a and 108b, causing the inverter 114 to be damaged. Similarly, if the voltage-lowering converter 104 did not operate with the thyristor 110 being conductive when one of the 400 V level power supplies or the 575 V power supply is connected between the power supply input terminals 101a and 101b, a high voltage would be applied to and damage the inverter 114.

With the arrangement described heretofore, however, if the voltage selected through the selector 150a is different from the commercial AC power supply voltage applied between the power supply input terminals 101a and 101b, the DC power supply apparatus does not operate. In other words, different from prior art DC power supply apparatuses; even in such a case, the DC power supply apparatus of the present invention is not damaged.

Since the voltage-lowering converter 104 is used, only a voltage of about 280 V is applied to the inverter 114 even when one of the 400 V level power supplies or the 575 V power supply is used. The voltage applied to the inverter 114 is also about 280 V when a lower commercial AC voltage of 100 V or 200 V is applied between the power supply input terminals 101a and 101b. Accordingly, as the IGBTs of the inverter 114, general-purpose, commonly available IGBTs having an emitter-collector withstand voltage of 600 V can be used. Even when a lower voltage of higher than 200 V is applied between the input terminals 101a and 101b, the highest possible voltage applied to the inverter 114 is only 380 V, the IGBTs of the inverter 114 can be such general-purpose, commonly available ones as stated above.

Instead of operating the bypass switch control unit 111 in accordance with a signal from the voltage-lowering converter control unit 109, it may be arranged to operate in accordance with a signal applied thereto directly from the voltage-lowering converter command unit 152.

An indicator, e.g. an indicator lamp or a buzzer, may be used to indicate when the coincidence circuit 149 indicates that the selection signal from the selection signal generator 150 and the outputs of the comparators 143, 144 and 145 do not coincide.

In the embodiment described above, the DC power supply apparatus is prevented from operating when the coincidence circuit 149 indicates that the selection signal do not coincide with the output signal of the comparators 143, 144 and 145. However, the DC power supply apparatus may be provided with a driving unit for driving the selector 150a of the selection signal generator 150 to switch to the state for providing the selection signal corresponding to the outputs of the comparators 143, 144 and 145.

Also, instead of connecting the thyristor 110 between the rectifier output terminal 103P and the emitter of the IGBT 105, it may be connected between the rectifier output terminal 103P and the voltage-lowering converter output terminal 104P.

Further, another device, e.g. a feedforward-type bypass switching power supply, may be used as the DC-to-high-frequency converter, in place of the inverter 114.

What is claimed is:

1. A DC power supply apparatus for arc-utilizing apparatuses, comprising:
   power supply input terminals adapted to receive one of a first AC voltage, a second AC voltage having a magnitude about twice that of said first AC voltage, and a third AC voltage having a magnitude twice that of the second AC voltage or larger;
   a rectifying unit having two rectifier input terminals connected to ones of said power supply input terminals for full-wave rectifying the AC voltage applied between said two rectifier input terminals and developing a rectified output voltage between two rectifier outputs;

a voltage-lowering converter having two converter input terminals between which said rectified output voltage is applied, and two converter output terminals between which a predetermined lowered output voltage is developed;

a bypass switch adapted to provide a bypass between one of said converter input terminals and one of said converter output terminals of said voltage-lowering converter;

first and second capacitors connected in series between said two converter output terminals of said voltage-lowering converter;

a switch circuit connected between the junction of said first and second capacitors and one of said two rectifier input terminals;

a DC-to-high-frequency converter for converting a DC voltage developed across the series combination of said first and second capacitors into a high-frequency voltage;

a voltage-transformer for voltage-transforming said high-frequency voltage from said DC-to-high-frequency converter;

a high-frequency-to-DC converter for converting the voltage-transformed high-frequency voltage into a DC voltage; and a controller for causing said bypass switch to be turned on, causing said voltage-lowering converter to be turned off and causing said switch circuit to be turned on when said first AC voltage is applied to said power supply input terminals, said controller causing said bypass switch to be turned on, causing said voltage-lowering converter to be turned off and causing said switch circuit to be turned off when said second AC voltage is applied to said power supply input terminals, said controller causing said bypass switch to be turned off, causing said voltage-lowering converter to be turned on and causing said switch circuit to be turned off when said third AC voltage is applied to said power supply input terminals.

2. The DC power supply apparatus according to claim 1 wherein said controller comprises:

a voltage detector for developing, as a voltage detector output signal, a first AC voltage representative signal when said first AC voltage is applied to said power supply input terminals, a second AC voltage representative signal when said second AC voltage is applied to said power supply input terminals, and a third AC voltage representative signal when said third AC voltage is applied to said power supply input terminals;

a selection signal generator having an operating device operable by a user of said DC power supply apparatus, for generating a selection signal corresponding to one of said first, second and third AC voltage representative signals selected by the user through the operation of said operating device; and a coincidence judgement device receiving said voltage detector output signal and said selection signal, for causing said bypass switch and said voltage-lowering converter to be turned off when said voltage detector output signal does not correspond to said selection signal.

3. The DC power supply apparatus according to claim 2 wherein, when both of said detector output signal and said selection signal represent said first AC voltage, said controller causes said bypass switch and said switch circuit to be turned on, and causes said voltage-lowering converter to be turned off.

4. The DC power supply apparatus according to claim 2 wherein, when both of said detector output signal and said selection signal represent said second AC voltage, said controller causes said bypass switch to be turned on, causes said switch circuit to be turned off, and causes said voltage-lowering converter to be turned off.

5. The DC power supply apparatus according to claim 2 wherein, when both of said detector output signal and said selection signal represent said third AC voltage, said controller causes said bypass switch and said switch circuit to be turned off, and causes said voltage-lowering converter to be turned on.

6. The DC power supply apparatus according to claim 1 wherein said controller comprises:

a voltage detector for developing, as a voltage detector output signal, a first AC voltage representative signal when said first AC voltage is applied to said power supply input terminals, a second AC voltage representative signal when said second AC voltage is applied to said power supply input terminals, and a third AC voltage representative signal when said third AC voltage is applied to said power supply input terminals;

a selection signal generator having an operating device operable by a user of said DC power supply apparatus, for generating a selection signal corresponding to one of said first, second and third AC voltage representative signals selected by the user through the operation of said operating device; and a coincidence judgement device receiving said voltage detector output signal and said selection signal, for causing said bypass switch and said switch circuit to be turned on and said voltage-lowering converter to be turned off when both of said detector output signal and said selection signal represent said first AC voltage, causing said bypass switch to be turned on, said switch circuit to be turned off and said voltage-lowering converter to be turned off when both of said detector output signal and said selection signal represent said second AC voltage, and causing said bypass switch and said switch circuit to be turned off and said voltage-lowering converter to be turned on when both of said detector output signal and said selection signal represent said third AC voltage;

said coincidence judgement device controlling said selection signal generator in such a manner that said selection signal can correspond to said voltage detector output signal when said detector output signal does not correspond to said selection signal.

* * * * *